UNITED STATES PATENT OFFICE.

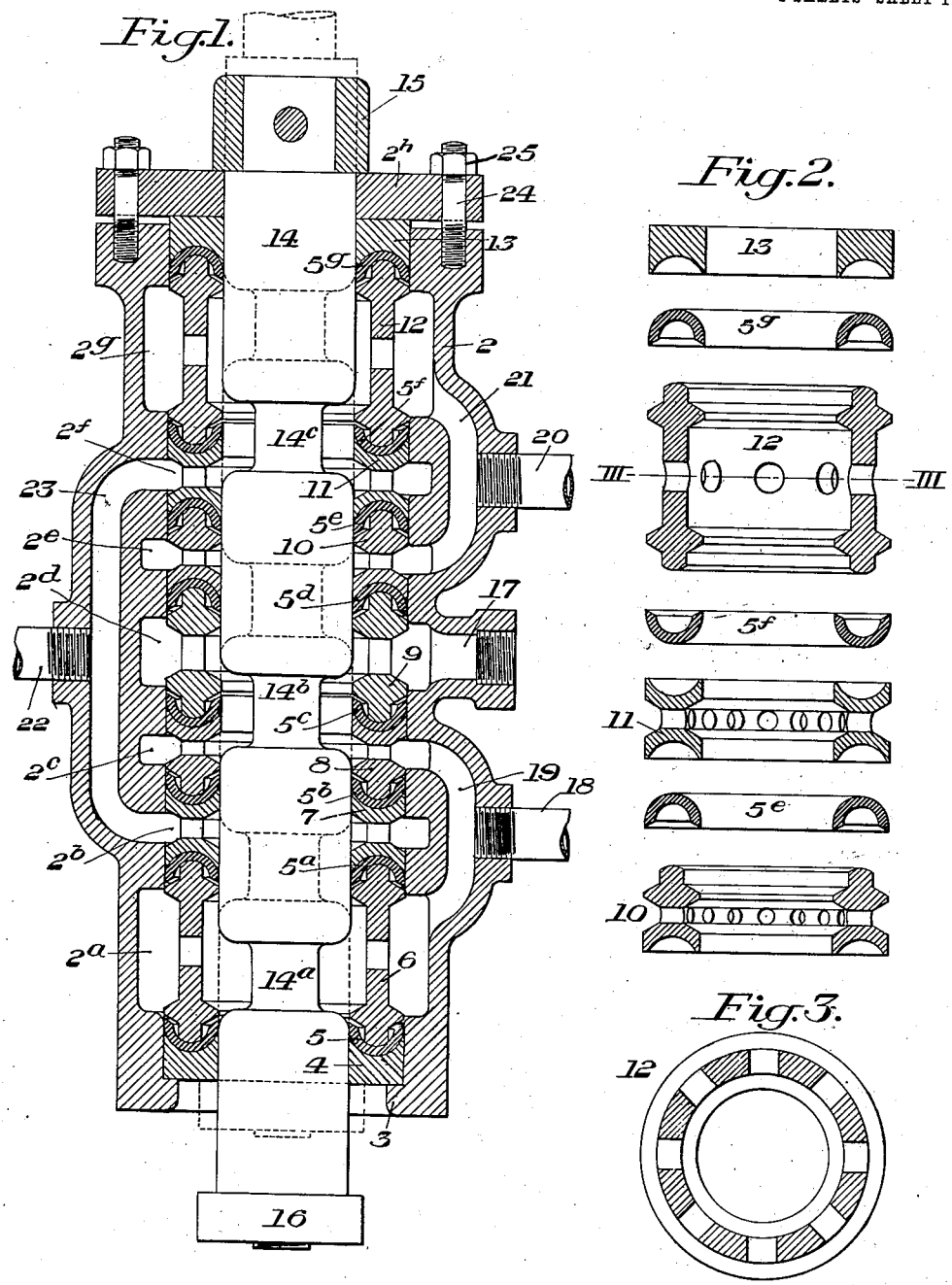

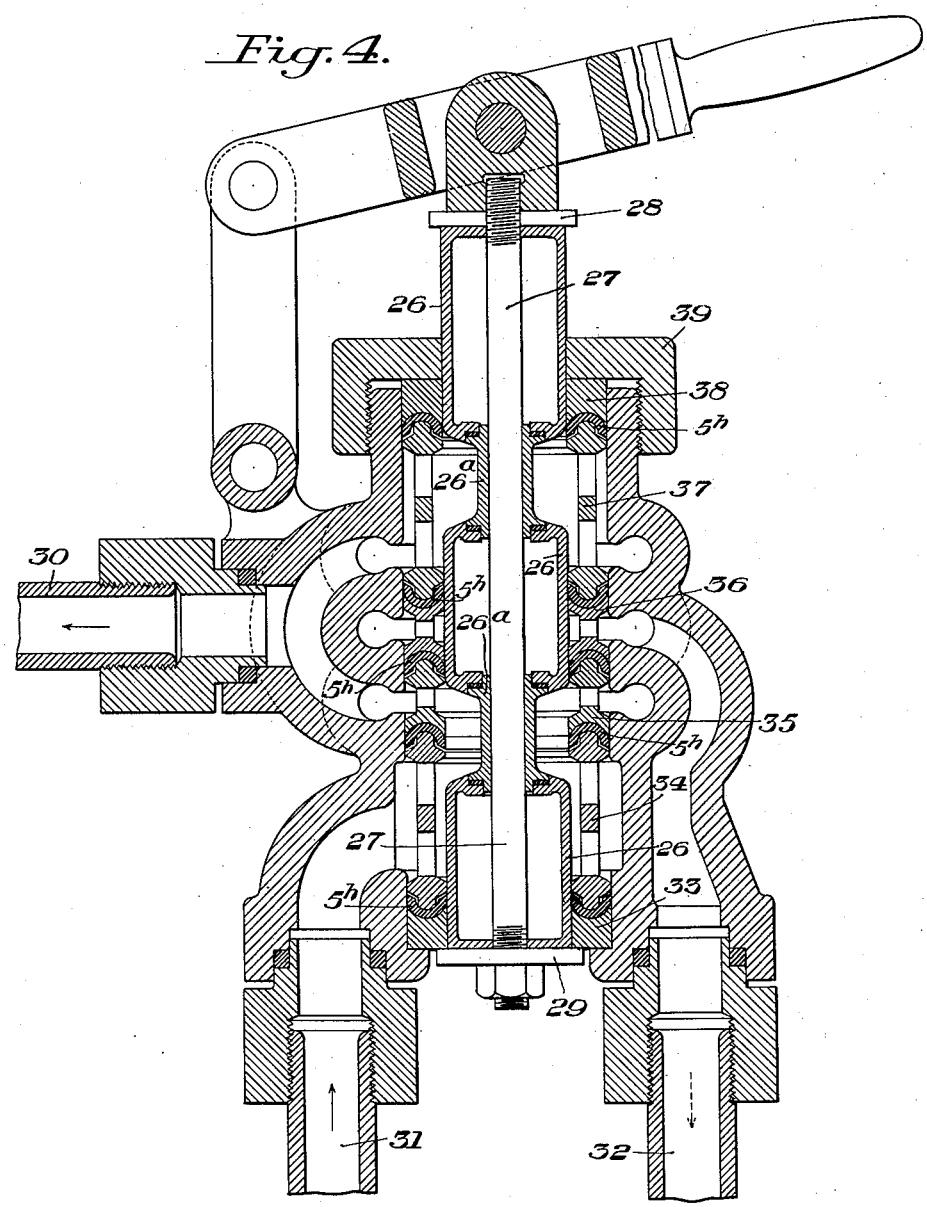

JOHN AUSTEN McCULLOCH, OF McKEESPORT, PENNSYLVANIA.

VALVE.

1,016,167.            Specification of Letters Patent.      Patented Jan. 30, 1912.

Application filed November 19, 1909. Serial No. 528,860.

*To all whom it may concern:*

Be it known that I, JOHN AUSTEN Mc-CULLOCH, of McKeesport, in the county of Allegheny and State of Pennsylvania, have invented a new and useful Improvement in Valves, of which the following is a full, clear, and exact description, reference being had to the accompanying drawings, forming part of this specification, in which—

Figure 1 is a sectional view of one form of valve made in accordance with my invention, showing the valve in two different positions. Fig. 2 is a sectional view of a portion of the sectional casing, showing the parts detached. Fig. 3 is a section through one of the members of the sectional casing as indicated on the line III—III of Fig. 2 and Fig. 4 is a view similar to Fig. 1 showing the modified form of valve.

My invention relates to an improvement in valves for controlling the flow of fluid pressure to and from pressure actuated cylinders, and is designed to provide a valve which is cheap of construction, readily taken apart and assembled.

A further object of my invention is to provide a valve in which the stem is free from packing rings, the packing rings being interposed between the adjacent members which form a shell or sectional casing within the valve casing. These packing rings are arranged to engage the valve, and also the bore of the valve casing, and prevent leakage from port to port along the body of the valve, and also between the sectional casing and the body of the valve. Also to provide a valve from which the parts which are subjected to wear may be removed and similar parts inserted, without disconnecting the valve casing, or without any appreciable interruption of the mechanism operated by the fluid pressure controlled by the valve.

The precise nature of my invention will be best understood by reference to the accompanying drawings which will now be described, it being premised, however, that various changes can be made in the details of construction and arrangement of parts without departing from the spirit and scope of my invention as defined in the appended claims.

Describing Figs. 1, 2 and 3, the numeral 2 designates the valve casing, and is bored out the same diameter throughout its length, with the exception of a small portion at the lower end thereof which is provided with the flange 3. Seated on this flange 3 and within the bore of the valve is a sectional casing which is composed of a plurality of members. The lower member 4 is provided with a convex annular groove in its upper face, and seated therein is a continuous semi-circular packing ring 5. Engaging this packing ring 5 is a second member 6 of the sectional casing, the upper end of which engages a second washer or packing ring $5^a$, which in turn is seated in a semi-circular annular groove in a member 7 which also forms a portion of the sectional casing, the upper end of which is also provided with a semi-circular annular groove in which is seated a packing ring $5^b$. The remainder of this sectional casing is formed of the members 8, 9, 10, 11, 12 and 13; and interposed between these members are the washers $5^c$, $5^d$, $5^e$, $5^f$ and $5^g$ which are similar to the washer 5. Secured to the upper portion of the body 2 and in engagement with the upper member 13 of the sectional casing is a bonnet $2^h$. Each of the members composing the sectional casing and the bonnet $2^h$ are bored out to receive the movable valve member 14. Secured to the upper end of this valve is a collar 15, and secured to the lower end thereof is a nut 16 which extends slightly beyond the face 3 of the valve 2. The collar 15 and nut 16 form positive stops for the full throw of the valve when moved in either direction. This valve is provided with the cut away portions $14^a$, $14^b$ and $14^c$ to allow the water or other fluid pressure to flow from one port to another. Each of the members 6, 7, 8, 9, 10, 11 and 12 are provided with an internal and external groove, and they are also provided with orifices connecting the interior and exterior grooves of these members with each other. The valve casing 2 is provided with interior annular grooves $2^a$, $2^b$, $2^c$, $2^d$, $2^e$, $2^f$ and $2^g$, and which register respectively with the annular groove on the exterior of the members 6, 7, 8, 9, 10, 11 and 12 of the sectional casing. 17 is a pressure inlet port which leads into the body of the valve casing and is in communication with the annular recess $2^d$. 18 is a pipe connected to one end of a hydraulic cylinder, which leads into the port 19, which is in communication with the recesses $2^a$ and $2^c$ in the valve body. 20 is a pipe which is connected with the other end of the cylinder, and communicates with the port 21 which is in communication with the annular recesses 2ᵈ and 2ᵉ in the valve body. 22 is a waste pipe which leads to any point of proper discharge and is connected with the port 23 which is in communication with the recesses 2ᵇ and 2ᶠ in the valve body.

The various parts may be assembled in the following manner: The various members together with their washers which form the sectional casing, and the bonnet 2ʰ may be placed on the valve, and the valve together with the casing is then inserted into the valve body and the bonnet 2ʰ is secured in place by means of the screws 24 and their nuts 25. The washers between the various members of the sectional casing act as packing rings between the various recesses or ports in the body of the casing and also act as packing rings for the valve to prevent the flow of water from one point to another between the walls of the casing, the bore of the valve body; and the body of the valve and the bore of the sectional casing. These packing rings are also placed in such a manner that the shoulders of the valve at its reduced portions 14ᵃ, 14ᵇ and 14ᶜ in its movement will not engage the edge of the packing rings and tend to spread them, but will also always engage them in such a manner that the edge will tend to close them instead of opening, and they are also so placed that the pressure of the fluid will tend to spread them to pack the space between ports.

In Fig. 4 I have illustrated a slightly modified form of valve, in which the valve member is formed of a plurality of hollow members 26 and 26ᵃ, which are held together by means of the through bolt 27. 28 and 29 are stops similar to the stops 15 and 16 shown on Fig. 1. In this device I have shown a valve to be used in connection with one end of a cylinder to force the piston in one direction by hydraulic pressure, and which may be returned in any manner. 30 is a pipe leading to the cylinder, 31 is a pressure supply pipe and 32 the exhaust or discharge. In this construction the sectional casing is also composed of a plurality of members 33, 34, 35, 36, 37 and 38; and interposed between each of these members is a flexible packing ring 5ʰ. The sectional casing is held in place by means of an internally threaded cap 39.

In the construction shown in Fig. 1, pressure is admitted through the inlet 17 to the port 19, and from said port pressure is admitted to one end of the cylinder through the pipe 18. The exhaust from the other end of the cylinder passes through the pipe 20 to the port 21 and thence around the portion 14ᶜ of the valve, through the port 23 to the exhaust pipe 22. When the valve is reversed by drawing it upward so that the member 16 engages the member 4, pressure will be admitted to the end of the cylinder which was previously exhausted through the pipe 21, and the opposite end of the cylinder will exhaust through the pipe 18 and the port 19 to the exhaust 22 around the portion 14ᵃ of the valve.

In the construction shown in Fig. 4, pressure is admitted to one end of the cylinder from the pipe 31 through the pipe 30 and when shifted in the reverse direction the contents of the cylinder are exhausted through the pipe 32 from the pipe 30.

It will readily be understood by those familiar with the art that I may provide an extra valve and sectional casing for each valve casing. The several members of the extra sectional casing and their interposed washers being stacked on the extra valve, so that they will be available to be inserted into the valve casing, when the sectional casing and the valve in use therein is to be removed for repairs or to be cleaned. When the sectional casing and valve are to be repaired the bonnet or screw cap is removed and the valve together with the sectional casing are withdrawn and the extra assembled sectional casing and valve are inserted in place. The cap or bonnet is then secured in place and the valve is ready for use. The removed parts can then be cleaned and repaired, and reassembled so as to be available for reinsertion when the valve is to be repaired.

The advantages of my invention result from the provision of a valve having a sectional casing interposed between the movable valve and the bore of the valve casing. Also in the provision of packing rings of the same size and shape between the various members forming the sectional casing, which pack the exterior and interior wall of said casing, so that there will be no likelihood of inserting the wrong washer at any place. Also from the provision of a valve from which the whole sectional casing, together with the valve may readily and simultaneously be withdrawn from the valve casing, and similar parts, which may have been previously stacked on the valve, may be simultaneously inserted and secured in their place, in a very short space of time. I am thereby enabled to repair a valve without any appreciable interruption of the continuity of the mechanism to which the valve controls the flow of fluid pressure.

I claim:

1. A valve having a main casing provided with fluid ports, a sectional casing within the main casing, said sectional casing being formed of a plurality of members with interposed U-shaped packing rings between said members, there being openings through said members in communication with the fluid ports adjacent thereto, a movable valve member within the sectional casing, and a plurality of piston heads on said valve member, said valve member also having a plurality of reduced portions between the piston heads, the reduced portions being arranged to open communication between adjacent ports in the casing, and the piston heads being arranged to close communication between said ports; substantially as described.

2. A hydraulic valve having a main casing provided with inlet and outlet ports, a sectional casing within the main casing formed of a plurality of members and U-shaped packing rings interposed between said members, said members having openings therethrough and communication with the ports adjacent thereto, and a movable valve member having reduced portions within the sectional casing, the reduced portions being arranged to open communication between the inlet and outlet ports, and the body portions of said valve being arranged to cut off communication between the ports, the packing rings being so disposed with relation to the reduced portions of the valve that the body portions thereof will always enter the rings from the rounded side to prevent cutting the packing rings; substantially as described.

In testimony whereof, I have hereunto set my hand.

JOHN AUSTEN McCULLOCH.

Witnesses:
  JAS. P. DAVIS,
  F. W. YOUNG.